United States Patent [19]
Orfei

[11] 3,789,799
[45] Feb. 5, 1974

[54] EDUCATIONAL OBSERVATORY
[75] Inventor: John B. Orfei, Revere, Mass.
[73] Assignee: American Science & Engineering, Inc., Cambridge, Mass.
[22] Filed: Oct. 12, 1971
[21] Appl. No.: 188,087

[52] U.S. Cl. .................................. 119/15, 119/18
[51] Int. Cl. ........................................... A01k 01/00
[58] Field of Search.. 119/15, 1, 17, 18, 29; 43/110, 43/134; 35/20

[56] References Cited
UNITED STATES PATENTS

| | | | |
|---|---|---|---|
| 3,330,063 | 7/1967 | Lockwood | 43/134 |
| 3,537,428 | 11/1970 | Montgomery | 119/15 X |
| 3,304,913 | 2/1967 | Nesher | 119/15 |
| 3,653,357 | 4/1972 | Sheidlower et al. | 119/15 X |
| 3,367,308 | 2/1968 | Quattrone et al. | 119/15 |
| 3,413,958 | 12/1968 | Artig | 119/15 |
| 3,626,902 | 12/1971 | Orfei | 119/15 |

Primary Examiner—Louis G. Mancene
Assistant Examiner—James H. Czerwonky
Attorney, Agent, or Firm—Charles Hieken; Jerry Cohen

[57] ABSTRACT

An educational observatory includes a dish-shaped base member of thermoplastic material formed with circular sidewall openings with recessed and reinforced sockets for accommodating transparent vials which may be detachably secured to these sockets. Each socket has a flange with a radial length greater than the thickness of the sidewall for bonding to the inside of the sidewall. The socket forms a seat for one end of the vial, and the ridge means between the sidewall opening and vial seat engages lip means on the vial to prevent its accidental removal from the socket. A transparent hood matingly engages an edge portion of the circumferential wall of the dish-shaped base member.

2 Claims, 5 Drawing Figures

PATENTED FEB 5 1974
3,789,799
SHEET 1 OF 2
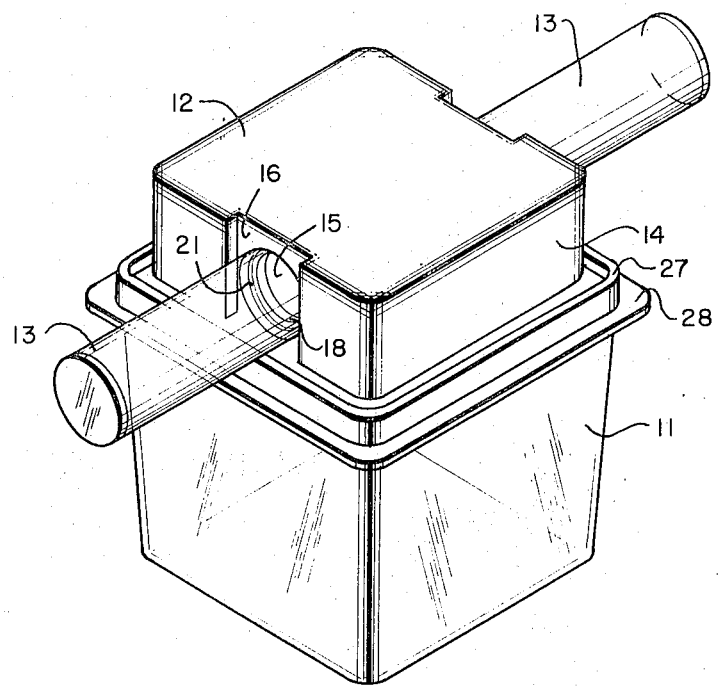
FIG. 1
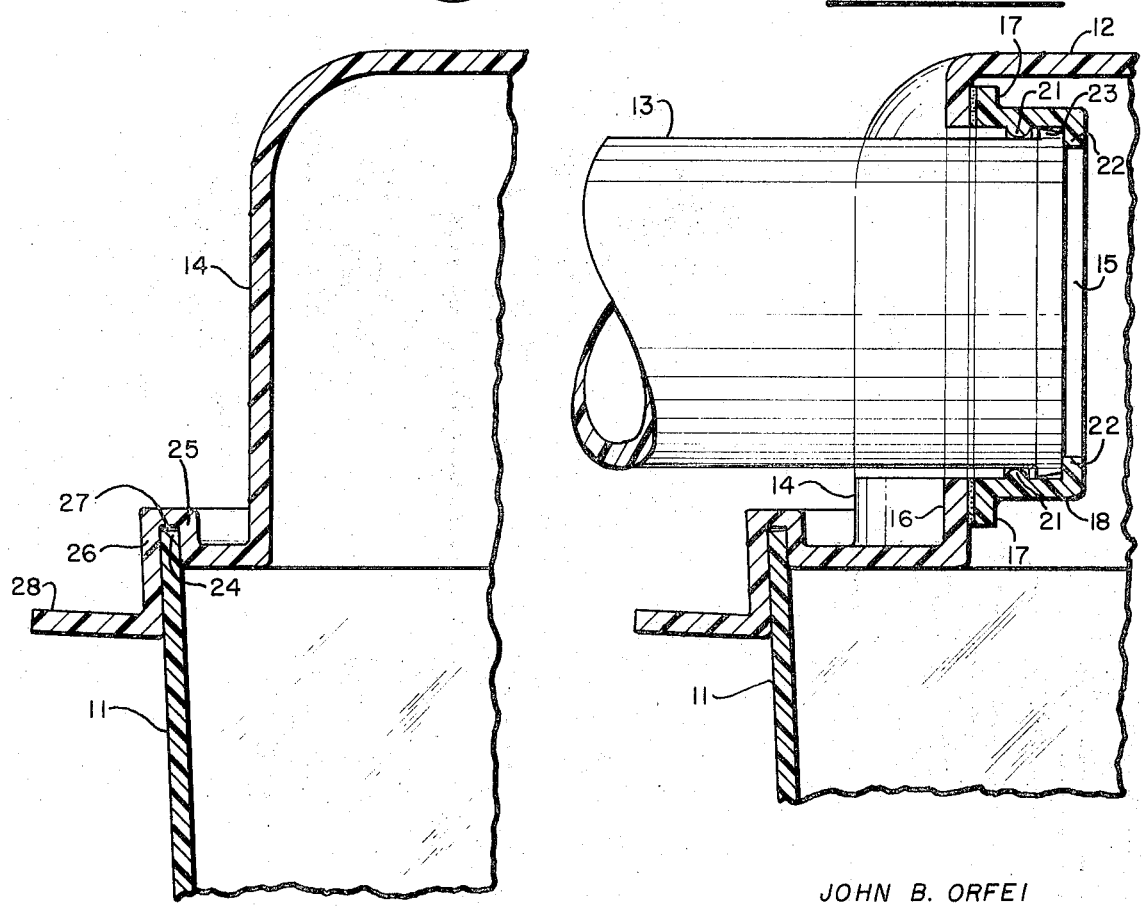
FIG. 5
FIG. 4
JOHN B. ORFEI
Inventor
By Charles Hieken
Attorney

EDUCATIONAL OBSERVATORY

BACKGROUND OF THE INVENTION

The present invention relates in general to educational and research devices and more particularly to a novel educational observatory useful for isolating and observing insects or other living organisms of a similar size. While effectively isolating from the environment the objects under observation, the invention permits access to the interior observation volume for feeding, sampling, or other purposes.

Although described herein as an observatory for insects, the present invention is highly versatile, with its range of uses limited only by the igenuity of the user. Among the readily apparent suitable uses would be that of a terrarium, or, when inverted as shown in the accompanying drawing, as an aquarium for raising aquatic specimens. While relatively inexpensive and easy to fabricate, the invention is of simple and durable construction, suitable for safe use by children. As such, the observatory could be most advantageously used in an educational application such as a classroom or laboratory.

BRIEF SUMMARY OF THE INVENTION

According to the invention, the educational observatory comprises a dish-shaped base member, the circumferential sidewall of which is provided with one or more circular openings with recessed and reinforced sockets, one or more transparent vials which may be detachably secured to these sockets, and a transparent hood or cover which is matingly engaged to an edge portion of the circumferential wall of the dish-shaped base member, thereby enclosing an observable volume.

One or more generally rectangular recessed indentions are integrally formed in the circumferential sidewall of the dish-shaped thermoplastic base member; each such recessed indention is provided with a circular opening. A reinforcing member of heavier-stock plastic is bonded to the inside surface of the recessed indention; the reinforcing member incorporates a socket which extends inwardly from the circular opening in the circumferential sidewall. The socket is so formed and dimensioned that its constricted inner edge and a circular ridge along its inner wall coact to detachably secure the bevelled lip edge of a vial placed therein.

The top edge of the circumferential sidewall of the dish-shaped base member is so formed as to provide a mating engagement with the edge portion of the transparent hood; the transparent hood is thereby detachably secured to the dish-shaped base member, whereby said dish-shaped base, attached vial or vials, and said hood member coact to enclose an observable volume, separating it from the surrounding environment.

It is among the objects of the invention to provide an educational or research observatory of simple and durable construction which is relatively inexpensive and easy to fabricate from readily available material such as plastic. In addition, the device is easy to use and thereby suitable for safe use by school children from the primary level upward.

Another object is to provide an observatory of the character described which provides an effective and convenient means of access to the interior observable volume.

Also among the objects of the invention is to provide a device of the character described which possesses the versatility of design to make it readily adaptable to diverse purposes. Although the device is described herein as an insect observatory, it may be employed for other purposes in which the features of environmental isolation, observability, and ready access are desired.

Numerous features, objects, and advantages of the invention will become apparent from the following specification when read in conjunction with the accompanying drawing in which:

BRIEF DESCRIPTION OF THE DRAWING

With reference to the drawing, the invention is shown in a position inverted to that in which it would normally be placed when used as an observatory; this inversion has been made in order to facilitate illustrating the details of construction.

FIG. 1 is an isometric view of the educational observatory embodying two vials detachably secured in the circumferential wall of the dish-shaped base member;

FIG. 4 is a view through section 4—4 of FIG. 2, illustrating the relationship for the mating engagement of the dish-shaped base member (here on top) to the transparent hood;

FIG. 5 is a view through section 5—5 of FIG. 2, illustrating the relationship of the reinforcing member as bonded to the indention in the circumferential sidewall of the dish-shaped member to provide an inwardly extending socket for detachably securing an access vial to the educational observatory.

DETAILED DESCRIPTION OF THE PREFERRED EMBODIMENTS

Figure 2:
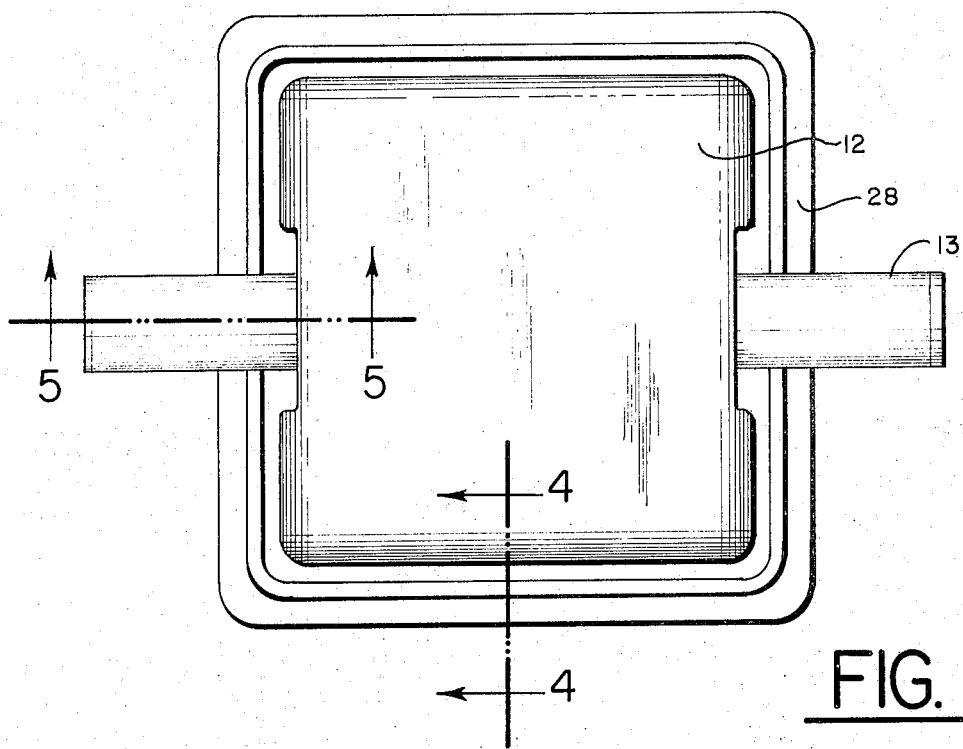
FIG. 2 is a plan view of FIG. 1.
Figure 3:
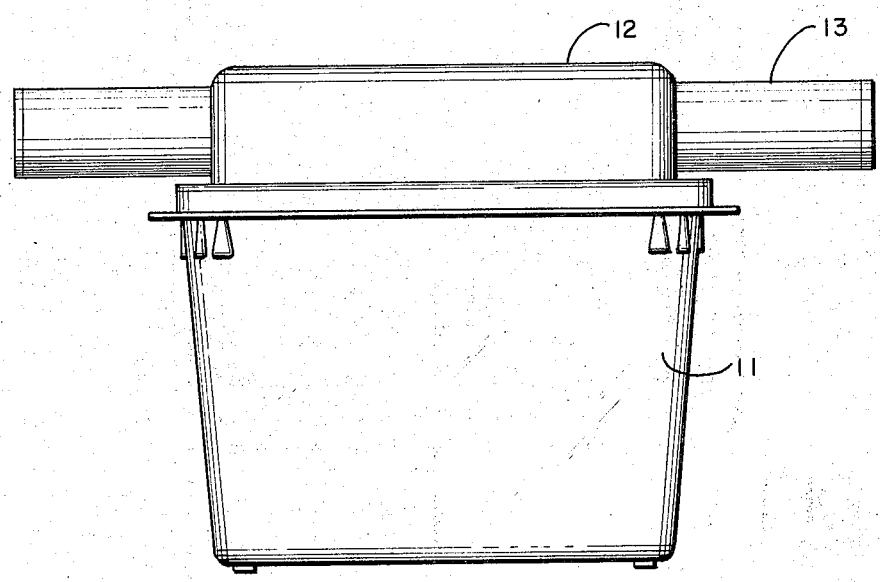
FIG. 3 is a side view of FIG. 1.

With reference to the drawings, FIGS. 1 and 3 are perspective and side views, respectively, of an exemplary embodiment of the invention. In each of these views, the device is shown in an inverted position from that contemplated for normal use as an observatory; the inversion has been made in order to provide greater clarity of illustration. The invention in its exemplary embodiment comprises a base 12 of generally-rectangular, dish-shaped configuration and a mateable hood 11. The base 12 and the hood 11 can be fabricated from readily available, low-cost plastic material which may be formed to the desired shape by inexpensive and well-known molding procedures.

The base 12 and the hood 11 coact when matingly engaged to enclose an observation volume. The mating engagement is effected by a channel 27 which is formed integrally with the base by a vertical indention in the horizontal rim 28 around the periphery of the base member. The circumferential edge 24 of the hood member 11 fits closely between the inner and outer sides 25 and 26 of the indention and within the channel 27, the width of the channel being dimensioned to assure a snug, sealing fit with the edge 24 of the hood member.

The circumferential wall 14 of the dish-shaped base member is formed with one or more generally rectangular recessed indentions, wherein is a circular opening 15. Bonded to the inner surface of each such recessed indention is a reinforcing member 17 of heavier-stock plastic. This reinforcing member 17 incorporates a socket which extends inwardly from the circular opening in the indention 16 in the circumferential wall 14. The socket serves the purpose of affording access to the enclosed observation volume while providing through the characteristics of its construction for detachably securing a vial 13 which closes the opening 15 to complete the enclosure of the observation volume.

The socket incorporated in reinforcing member 17 is so constructed and dimensioned that it provides a snug fit for and thereby detachably secures vial 13 to the base member 12. An inwardly extending collar 18 is integrally formed in the reinforcing member 17. The collar incorporates a discontinuous series of ridges 21 protruding from its inner wall in a circular pattern and a constricted lip 22 at its inner edge so spaced as to detachably secure the bevelled lip 23 of a vial 13 inserted into the socket.

The span of diametrically opposed portions of the vial lip 23 is slightly greater than the span between diametrically opposed radially innermost points of the constricted lip 22 and on the series of ridges 21 for coacting with the lip 23 of the vial when seated in the socket for opposing ejection of the vial, the constricted lip 22 forming a seat for an end of the vial for preventing inward movement of the vial therebeyond while defining a passage between the vial and the observable volume. The reinforcing member 17 is formed with a flange surrounding the circular opening 15 and has a radial length greater than the thickness of the reinforcing member and of the sidewall.

What is claimed is:

1. An educational observatory comprising,
   a first dish-shaped thermoplastic member having a circumferential sidewall with at least one opening for receiving a vial having at least one end with a lip,
   a reinforcing member formed with a flange surrounding said one opening and having a radial length greater than the thickness of said reinforcing member bonded to the inside of said circumferential sidewall formed with an inwardly extending socket for detachably securing the vial thereto passing through said one opening,
   said socket comprising an inwardly extending collar having a constricted lip at its inner edge forming a seat for an end of the vial for preventing inward movement of the vial there-beyond while defining a passage between the vial and said observable volume and also having means intermediate said constricted lip and said at least one opening for coacting with the lip of the vial when seated in said socket for opposing ejection of the vial,
   the span of diametrically opposed portions of the vial lip being slightly greater than the span between diametrically opposed radially innermost points on said constricted lip,
   a transparent hood member for mating engagement with an edge portion of said circumferential wall, said edge portion comprising means for detachably securing said hood member to said first member whereby said first and hood members coact to enclose an observable volume.

2. An educational observatory in accordance with claim 1 and further comprising,
   said vial closed at one end and open at the other end formed with a lip at the open end thereof seated between said means intermediate said constricted lip and said at least one opening and said constricted lip in said socket and passing through said at least one opening.

\* \* \* \* \*